UNITED STATES PATENT OFFICE.

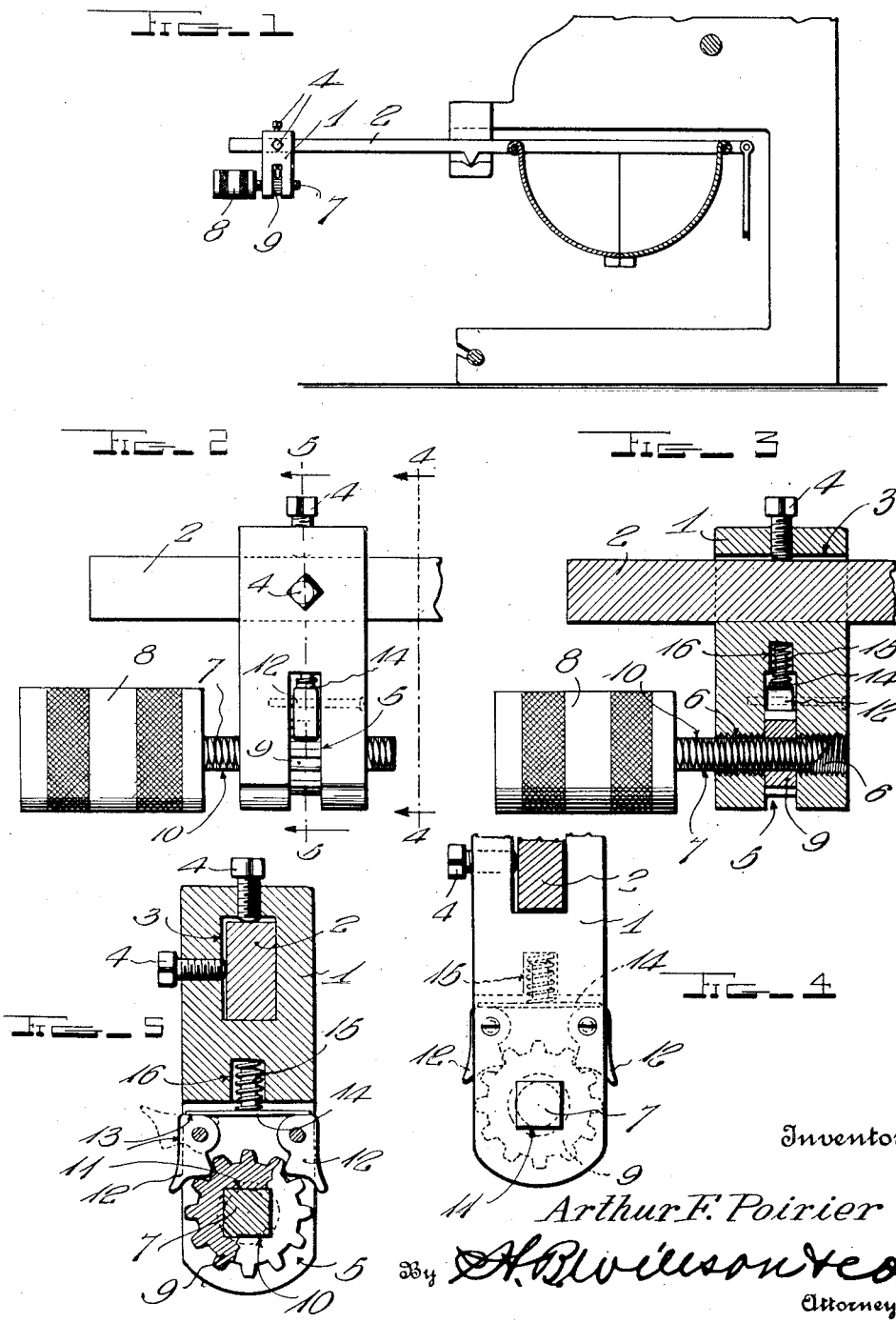

ARTHUR F. POIRIER, OF WILTON, MAINE.

ADJUSTABLE WEIGHT.

1,357,471.  Specification of Letters Patent.  Patented Nov. 2, 1920.

Application filed March 1, 1920. Serial No. 362,429.

*To all whom it may concern:*

Be it known that I, ARTHUR F. POIRIER, a subject of the King of England, residing at Wilton, in the county of Franklin and State of Maine, have invented certain new and useful Improvements in Adjustable Weights; and I do declare the following to be a full, clear, and exact description of the invention, such as will enable others skilled in the art to which it appertains to make and use the same.

My invention relates to improvements in adjustable weights for weighing devices, and more particularly to a device of this class intended primarily for use on the beams of Bramwell feeder, for controlling the tipping of such beams and the resultant discharge of the carded material.

The principal object of the invention is to provide a simply constructed and inexpensive, yet a highly efficient and reliable device including a weight which may be accurately adjusted with greater ease and in less time than weights commonly used.

A further object is to provide a screw-threaded adjusting device for the weight and means for retarding rotation of said adjusting device at equally spaced points throughout a revolution thereof, it being intended that the movement of said adjusting device between any two of the spaced points in question, shall adjust the weight a predetermined amount to cause the beam to tilt with a greater or lesser amount of ease.

Yet another object is to provide a device of the character set forth in which an audible indicating means is included so that the amount which the adjusting device is rotated, can be readily ascertained even though it cannot be conveniently viewed.

With the foregoing and minor objects in view, the invention resides in the novel features of construction and unique association of parts hereinafter described and claimed, the descriptive matter being supplemented by the accompanying drawing.

Figure 1 is a side elevation of my invention applied to a Bramwell feeder.

Fig. 2 is an enlarged side elevation.

Fig. 3 is a vertical longitudinal section.

Figs. 4 and 5 are vertical transverse sections indicated by the lines 4—4 and 5—5 of Fig. 2.

In the drawings above briefly described, the numeral 1 designates a supporting member here shown in the form of an approximately rectangular metal block adapted for mounting on the weighing beam 2 of a Bramwell feeder or on the corresponding beam of any weighing device. This block is shown separate from the beam 2 and provided with an opening 3 in which said beam is secured by set-screws 4, but it is obvious that in some instances the beam and block may be integrally formed.

The opening 3 is preferably located near the upper end of the block 1 and the lower end of said block is provided with a recess 5 which is preferably in the form of a notch extending transversely with respect to the aforesaid opening 3. The block 1 is provided with a threaded bore 6 parallel with the opening 3 and intersecting the recess 5. This bore receives an adjusting screw 7 for a beam-balancing weight 8. In the present instance, the screw and the weight are rotatable bodily and rotation of them in one direction or the other will vary the distance between the weight and the beam fulcrum, to control the tilting of the beam as required.

Located within the recess 5 is a toothed wheel 9 through which the screw 7 passes slidably but non-rotatably, and although this connection between the wheel and screw is preferably effected by flattening the sides of said screw as shown at 10 and providing the wheel with a polysided opening 11 to engage the flattened sides, such connection might otherwise be obtained. In all cases, however, when the general construction herein disclosed is used, I intend that the screw 7 shall slide through the wheel 9 while being adjusted, and that said wheel shall rotate with the screw.

Coacting with the toothed wheel 9, are shown a pair of spring-pressed detents 12, although in some instances one of such detents will suffice. The parts 12 are preferably in the form of pivoted dogs located within the recess 5 and when both of these dogs engage the teeth of the wheel 9 as shown in Figs. 4 and 5, said wheel will be held against rotation and consequently the adjusting screw 7 of the weight 8 cannot be turned. When the weighing capacity of the machine is to be increased or decreased however, the release of one dog or the other will permit rotation of the screw 7 in the proper direction to obtain the necessary adjustment. While such rotation of the wheel is taking place, the dog which is allowed to remain in engagement with the wheel 9, snaps over the teeth of said wheel and thus yieldably retards rotation of the wheel and screw 7 at a predetermined number of equally spaced points, throughout a revolution of these parts. The threads of the screw 7 are pitched so that rotation of said screw between any two points at which it is retarded, will adjust the weight to vary the weighing capacity of the machine a predetermined amount. In the present instance, I intend that rotation of the screw to the extent set forth to the right, shall decrease the weighing capacity one-fourth of a grain, while a corresponding increase occurs when turning the device one notch to the left.

Not only can the amount of adjustment be determined by feeling the action of the spring-pressed dog against the toothed wheel 9 but the clicking of the dog over the teeth is audible and thus the amount of adjustment is indicated still more effectively.

The dogs 12 are by preference pivoted in the recess 5 above the wheel 9 and are provided with flat faces 13 at right angles to each other for engagement with the opposite ends of a presser-bar 14 which is also located in the recess 5. The presser-bar 14 is forced into contact with the dogs by a coil spring 15 which may well be housed in the socket 16 formed in the block 1. When the parts are in the position shown in full lines in Fig. 5 the presser-bar 14 holds both dogs in yieldable engagement with wheel 9 and thus locks the latter against turning in either direction. When either dog is released, as shown in dotted lines in Fig. 5, the spring-pressed bar 14 contacts with another of the flat faces 13 and thus holds such dog released until the required adjustment has been made.

The device as shown is extremely simple and inexpensive and such construction may therefore be preferred, but within the scope of the invention as claimed, the device may be embodied in numerous other forms.

I claim:

1. A device of the class described comprising a supporting member, an adjustable weight carried by said supporting member and having a rotatable screw-threaded adjusting device, and means for successively retarding the rotation of said adjusting device at equally spaced points throughout a revolution thereof to set the weight at predetermined points.

2. A device of the class described comprising a supporting member, an adjustable weight carried by said supporting member and having a rotatable screw-threaded adjusting device, and audible means for successively retarding the rotation of said adjusting device at equally spaced points throughout a revolution thereof to set the weight at predetermined points.

3. A device of the class described comprising a supporting member, an adjustable weight carried by said supporting member and having a rotatable screw-threaded adjusting device, a toothed wheel rotatable with said adjusting device, and a spring-pressed detent engaging said wheel to retard rotation thereof at equally spaced points throughout a revolution thereof.

4. A device of the class described comprising a supporting member provided with a recess, a weight having an adjusting screw spanning said recess, said screw having a threaded engagement with said supporting member, a toothed wheel through which said screw passes slidably but non-rotatably, said wheel being rotatably received in said recess, and a spring-pressed detent coacting with the teeth of said wheel to retard rotation of said wheel at equally spaced points throughout a revolution thereof.

5. A device of the class described comprising a supporting block having near one end an opening adapted to receive a weighing beam, the other end of said block having a recess transverse with respect to said opening, said block also having a threaded bore intersecting said recess and extending in a direction parallel to said opening, a weight having a flat sided adjusting screw threaded through said bore and spanning said recess, a toothed wheel through which said screw passes slidably but non-rotatably, said wheel being positioned in said recess, and a spring-pressed detent in said recess coacting with the teeth of said wheel to retard the rotation of said wheel at equally spaced points throughout the revolution thereof.

6. A device of the class described comprising a supporting member, an adjustable weight carried by said supporting member and having a screw-threaded adjusting device, a toothed wheel rotatable with said adjusting device, and a pair of spring-pressed dogs coacting with the wheel teeth and controlling rotation of said wheel and said adjusting device in both directions.

7. A device of the class described comprising a supporting block having near one end an opening adapted to receive a weighing beam, the other end of said block having a recess transverse with respect to said opening, said block also having a threaded bore intersecting said recess and extending in a direction parallel to said opening, a weight having a flat sided adjusting screw threaded through said bore and spanning said recess, a toothed wheel through which said screw passes slidably but non-rotatably, said wheel being positioned in said recess, a pair of pivoted dogs mounted in said recess and engaging the teeth of said wheel to control rotation of the latter in both directions, a presser-bar in said recess for holding said dogs either in released or in operative position, and a coil spring bearing against said presser-bar.

8. A device of the class described comprising a supporting member, a weight carried by said member and having a screw-threaded adjusting device, and audible indicating means operable at equally spaced points throughout a revolution of said adjusting device.

In testimony whereof I have hereunto set my hand.

ARTHUR F. POIRIER.